Nov. 21, 1939.　　　　S. J. ZAND　　　　2,180,843
NOISE REDUCING MEANS FOR CABIN AIRCRAFT
Original Filed March 29, 1933
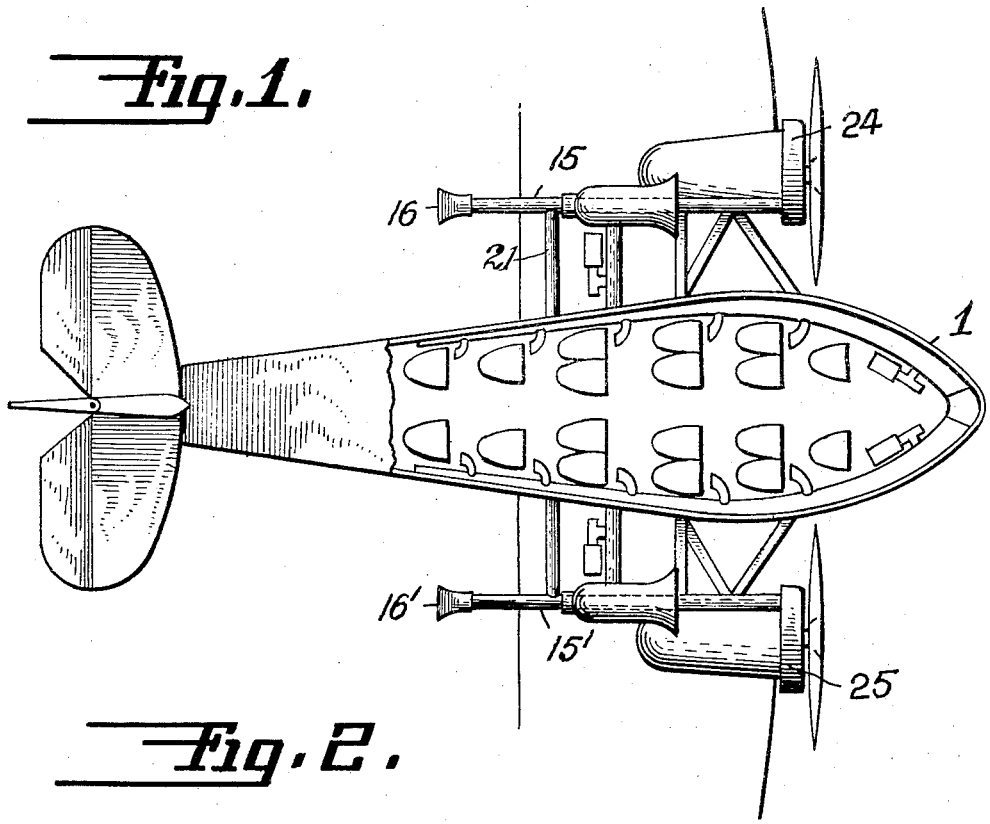
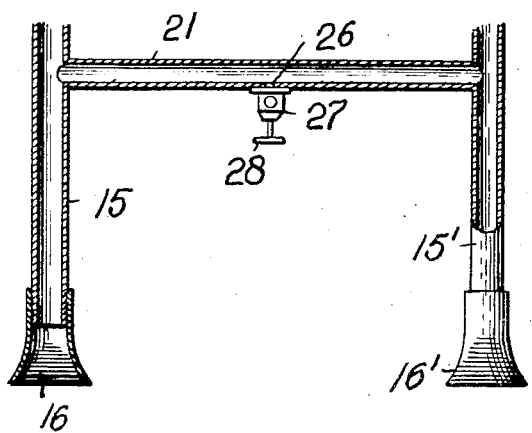
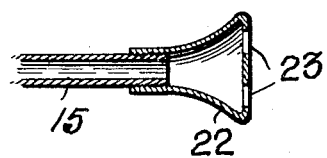
INVENTOR
STEPHEN J. ZAND
BY
HIS ATTORNEY Patented Nov. 21, 1939

2,180,843

UNITED STATES PATENT OFFICE 2,180,843

NOISE REDUCING MEANS FOR CABIN AIRCRAFT

Stephen J. Zand, Forest Hills, N. Y., assignor to Sperry Gyroscope Company, Inc., Brooklyn, N. Y., a corporation of New York Original application March 29, 1933, Serial No. 663,302, now Patent No. 2,122,447, dated July 5, 1938. Divided and this application October 27, 1937, Serial No. 171,275

4 Claims. (Cl. 181—36)

This invention relates to noise reducing means for aircraft, especially of the cabin type designed for carrying passengers. One of the principal objections of the general public to aircraft travel has been the excessive vibration and noise in the passenger cabins, rendering conversation impossible and contributing largely to general discomfort and air sickness.

This application is a division of my copending application, now Patent No. 2,122,447, dated July 5, 1938, for Noise reducing means for cabin aircraft.

The principal object of the present invention is to reduce the noise emitted from the aircraft engines, the invention being especially adapted for reducing the noise of the engines of multi-motored craft without decreasing the efficiency thereof. In such craft it is found that several engines usually have very close periods of vibration so that the predominant sound from each is a note or less apart. Such a combination produces very disagreeable beat notes, or in other words, discords. To eliminate this, I provide means for tuning the predominant notes of the engines so they they are the same or some non-beat producing relative frequency. By this means the dominant notes or sound periods emitted from the two engines are made to harmonize. In addition, by interference effects and proper filtering the total sound may be greatly reduced.

Referring to the drawing,

Fig. 1 is a plan view, partly in section, of a cabin airplane employing the structure of the present invention.

Fig. 2 is a fragmentary, part sectional view illustrating the details of one form of the invention.

Fig. 3 is a fragmentary sectional view illustrating details of a slightly modified form of the invention.

Similar characters of reference are used in all of the above figures to indicate corresponding parts.

Referring, now, to the said drawing, the reference numeral 1 designates an aircraft, such as an airplane, having dual engines 24 and 25, although it will be understood that the invention is equally applicable to aircraft having more than two engines. Engines 24 and 25 are provided with exhaust pipes 15 and 15' directed rearwardly therefrom and having mufflers 16 and 16' thereon.

I find as the result of considerable experimentation that it is possible to reduce the disagreeable beat notes of multi-engined planes by a method of turning or synchronizing the predominant sound frequencies caused by the engine exhaust. To this end, I may provide at least one of the exhaust pipes 15 or 15' (see Fig. 3) with variable end or nozzle plates 22 having different size holes 23 by which the predominant note of the exhaust may be varied so as to properly harmonize with the predominant note of the other engine and, therefore, avoid the objectionable beat notes referred to.

Another method I have shown (see Figs. 1 and 2) is to provide a cross pipe 21 connecting the exhaust pipes 15 and 15' of the two engines. Such a pipe is preferably provided with a small opening 26 to the atmosphere which may have a short pipe 27 connected thereto, the opening of which is adjustable by a needle valve 28. By such a means the disagreeable beat notes above referred to may be eliminated either by interference or filtering, or both, and the general sound level of the engines greatly reduced.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. As a means for reducing noise in multi-motor aircraft, the combination with a plurality of engines and exhaust passages therefor, of a cross pipe connecting said passages to harmonize and attenuate the predominant sound emissions from each.

2. As a means for reducing noise in multi-motor aircraft, the combination with a plurality of engines and exhaust passages therefor, of a cross pipe connecting said passages, and an adjustable tuning or filtering opening in said pipe to harmonize and attenuate the predominant sound emission from each.

3. In an aircraft, a plurality of internal combustion engines each having an exhaust passage and operated at substantially the same speeds, and means comprising a direct gas connection between the exhaust passages of said engines subjected only to the pressures caused by the engine exhaust gases operating against the friction of the exhaust conduit for eliminating beat notes produced by the simultaneous operation of said engines.

4. In an aircraft, two internal combustion motors for propelling the aircraft, each of said motors having an exhaust passage and an exhaust pipe connected to the exhaust passage, and a direct equalizing connection between said exhaust pipes subjected only to the pressures caused by the engine exhaust gases operating against the friction of the exhaust passage for harmonizing and attenuating the predominant sound emissions from the said motors.

STEPHEN J. ZAND.